Patented May 12, 1936

2,040,070

UNITED STATES PATENT OFFICE 2,040,070

SALTS OF ORGANIC ARSONIC ACIDS WITH ACRIDINE COMPOUNDS

Max Bockmühl, Frankfort-on-the-Main, and Alfred Fehrle, Bad Soden-on-the-Taunus, Germany, assignors to Winthrop Chemical Company, Inc., New York, N. Y., a corporation of New York No Drawing. Application July 1, 1932, Serial No. 620,538. In Germany July 4, 1931

8 Claims. (Cl. 260—14)

The present invention relates to salts of organic arsonic acids with acridine compounds.

We have found that new compounds are obtained by causing a nitro-acridine base to react with an organic arsonic acid, or by causing a salt of the acid to react with a salt of the base; these new compounds have considerable advantages over the starting materials. Among the nitro-acridines there may especially be used compounds containing in 9-position an amino group which may be substituted by an organic radical, for instance those of the following general formula:

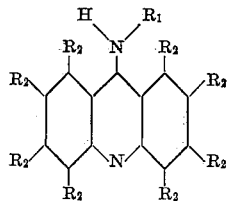

wherein $R_1$ stands for a substituent of the following general formula $$R—N(alkyl)_2$$

R being a radical of the group consisting of ethyl, beta-hydroxypropyl, ethylaminophenyl, beta-hydroxypropylaminophenyl, gamma-ethylamino-beta-hydroxypropylaminophenyl, ethoxyphenyl and acetylethylamide,—and at least one of the $R_2$ stands for the nitro group, the other $R_2$ representing hydrogen, halogen, amino, alkyl or alkoxy. Among the arsonic acids there may be used aromatic arsonic acids and heterocyclic arsonic acids which may contain various substituents, for instance acids of the following general formula

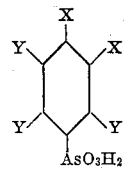

wherein one X stands for an acylamino group, the remaining X for hydrogen or hydroxyl and Y for hydrogen, halogen, alkyl or hydroxyl. A particularly good activity is exhibited by those compounds which are made by using arsonic acids which contain a metal bound in a complex manner.

The new salts from arsonic acids and nitro-acridines are particularly useful in therapeutics for treating streptococcic infections and diseases of animals, such as piroplasmosis. They may be injected and also be administered perorally. They have a yellow to brown color.

In the following examples the 2.3-dimethoxy-8-nitro-5-(gamma - diethylamino - beta - hydroxy-propylamino)-acridine has been described as acridine component. In a completely analogous manner valuable compounds can also be prepared, for instance, from the following acridines:

3 - ethoxy-8-nitro- 5 - (beta-diethylaminoethyl amino)-acridine

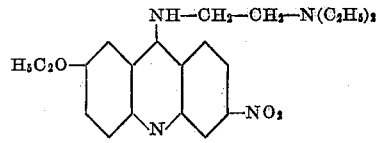

3-ethoxy- 8 - nitro - 5 - gamma (diethylamino-beta-hydroxypropylamino)-acridine

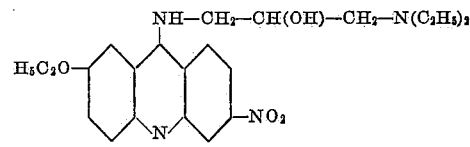

3 - ethoxy-8-nitro-5- (para-beta-diethylamino-ethylaminophenylamino)-acridine

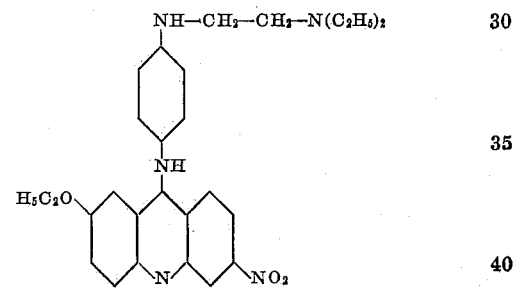

3-ethoxy- 8-nitro - 5 -(para - gamma - diethyl-amino-beta-hydroxypropylamino-phenylamino)-acridine;

3 - ethoxy-8- nitro - 5 - (para-gamma-beta'-di-ethylamino - ethylamino - beta-hydroxypropyl-aminophenylamino)-acridine;

3 - ethoxy-8.2-dinitro - 5 - (para - beta-diethyl-aminoethoxyphenylamino)-acridine;

3-methoxy-8-nitro-5-(gamma-dimethylamino-beta-hydroxypropylamino)-acridine;

8-nitro-5- (gamma-dimethylamino - beta - hydroxypropylamino)-acridine;

3 - ethoxy-7- nitro - 5 - (gamma-diethylamino-beta-hydroxypropylamino)-acridine;

3-ethoxy-8-nitroacridyl(5)glycine-beta-diethyl-aminoethylamide;

3-beta-diethylamino-ethoxy-8-nitro-5-aminoacridine;

3-beta-diethylaminoethoxy-8-nitro-5-isoamyl-aminoacridine;

3-beta-piperidinoethoxy-8-nitro-5-aminoacridine;

1-beta-diethylaminoethoxy-8-nitro-5-aminoacridine;

2-beta-diethylaminoethyl-2-nitro-5-aminoacridine;

2-gamma-diethylamino-propyloxy-8-nitro-5-aminoacridine.

Besides the arsonic acids mentioned above, there may also be used, for instance, 2-methyloxy-benzimidazole-5-arsonic acid, 2-hydroxypyridine-5-arsonic acid, the complex bismuth compound of 3,4-dihydroxybenzene-1-arsonic acid.

The following examples illustrate the invention:

1.—33 grams of para-glycolylaminobenzene-arsonic acid are dissolved as far as possible in 100 cc. of methyl alcohol and 30 cc. of water. A hot solution of 25.0 grams of 2,3-dimethoxy-8-nitro-5-(gamma-diethylamino-beta-hydroxypropylamino)-acridine in 65 cc. of methyl alcohol is then added. A clear solution is obtained; on addition of acetone, the salt formed separates in the form of a yellowish-brown powder. It is very easily soluble in water, more difficultly soluble in methyl alcohol and scarcely soluble in ethyl alcohol.

2.—22 grams of 4-glycolylaminobenzene-1-arsonic acid are dissolved in a hot mixture of 100 cc. of methyl alcohol and 30 cc. of water. A hot solution of 34 grams of 2,3-dimethoxy-8-nitro-5-(gamma-diethylamino-beta-hydroxy-proplyamino)-acridine in 40 cc. of methyl alcohol is then added. After boiling for a short time, the solution is filtered and cooled. The salt formed separates from the filtrate in the form of reddish-brown crystals. It is easily soluble in water, not so easily soluble in methyl alcohol and scarcely soluble in ethyl alcohol.

3.—12 grams of 2-oxymethylbenzimidazole-5-arsonic acid are suspended in 80 cc. of methyl alcohol and 60 cc. of water. A hot solution of 8.5 grams of 2,3-dimethoxy-2-nitro-8-(gamma-diethylamino-beta-hydroxypropylamino)-acridine in 30 cc. of methyl alcohol is then added. The whole is heated to boiling temperature; about 40 cc. of water are added until complete solution has taken place; filtration follows. After cooling, the salt is separated from the solution by addition of acetone. It forms a yellowish-brown powder which is very easily soluble in water and difficultly soluble in methyl alcohol.

4.—12 grams of 2-oxymethylbenzimidazole-5-arsonic acid are suspended in 125 cc. of water together with 17 grams of 2,3-dimethoxy-8-nitro-5-(gamma-diethylamino-beta-hydroxypropylamino)-acridine. The suspension is heated to boiling temperature, whereupon dissolution occurs. On addition of acetone or ethyl alcohol the salt formed separates from the cooled solution in the form of a reddish-brown powder. It is very easily soluble in water, difficultly soluble in methyl alcohol and scarcely soluble in ethyl alcohol.

5.—12 grams of 2-methyl-4-glycolylamino-benzene-1-arsonic acid are dissolved in a hot mixture of 40 cc. of methyl alcohol and 15 cc. of water. A hot solution of 8.5 grams of 2,3-dimethoxy-8-nitro-5-(gamma-diethylamino-beta-hydroxypropylamino)-acridine in 30 cc. of methyl alcohol is added. The mixture is heated to boiling temperature, filtered and cooled. By addition of acetone the salt formed separates in the form of a brown powder. It is very easily soluble in water and not so easily soluble in methyl alcohol.

6.—10.2 grams of the sodium salt of 3-methoxy-4-hydroxy-5-aminobenzene-1-arsonic acid are suspended in 40 cc. of methyl alcohol, and 15 cc. of 2N-hydrochloric acid are added whereby the whole is dissolved. A hot solution of 6.4 grams of 2,3-dimethoxy-8-nitro-5-(gamma-diethylamino-beta-hydroxypropylamino)-acridine in 25 cc. of methyl alcohol is added. The solution is boiled, filtered and the salt is separated by cautious addition of alcohol. It forms a brown powder which is very easily soluble in water and methyl alcohol.

7.—5.5 grams of 3-acetylamino-4-hydroxybenzene-1-arsonic acid are suspended in 25 cc. of methyl alcohol and 25 cc. of water. A hot solution of 4.2 grams of 2,3-dimethoxy-8-nitro-5-(gamma-diethylamino-beta-hydroxypropylamino)-acridine in 15 cc. of methyl alcohol is then added. The whole is heated to boiling temperature, whereby dissolution occurs, filtered and cooled. On addition of acetone, the salt formed separates. It forms a yellowish-brown powder which is easily soluble in water.

8.—6.2 grams of 3-acetylamino-4-hydroxy-5-chlorobenzene-1-arsonic acid are suspended in 40 cc. of water. A hot solution of 4.2 grams of 2,3-dimethoxy-8-nitro-5-(gamma-diethylamino-beta-hydroxypropylamino)-acridine in 15 cc. of methyl alcohol is then added. The whole is boiled and filtered. The salt formed separates from the filtrate in the form of a yellowish-brown powder. It is soluble in water, difficultly soluble in methyl alcohol and scarcely soluble in ethyl alcohol.

9.—8.6 grams of the sodium salt of 2-argento-mercapto-benzoxazole-5-arsonic acid are dissolved in 60 cc. of water. A warm solution of 5 grams of 2,3-dimethoxy-8-nitro-5-(gamma-diethylamino-beta-hydroxypropylamino)-acridine-dihydrochloride in 30 cc. of water is then added, while strongly stirring. The salt, which is difficultly soluble, directly separates. After filtering by suction and washing, it is obtained in the form of a brown powder.

10.—By using 8.8 grams of the sodium salt of 2-argento-mercaptobenzoxazole-7-chloro-5-arsonic acid for the reaction described in the preceding example, the corresponding salt is obtained which is likewise very difficultly soluble in water.

11.—5 grams of 2,3-dimethoxy-8-nitro-5-(gamma-diethylamino-beta-hydroxypropylamino)-acridine-dihydrochloride are dissolved in 200 cc. of water. A solution of 8.4 grams of the sodium salt of 1-methyl-2-argento-mercaptobenzimidazole-5-arsonic acid in 100 cc. of water is added, while stirring. The salt formed directly separates; it is filtered by suction and washed. It forms a brown powder which is very difficultly soluble in water and scarcely soluble in alcohol.

12.—5.7 grams of 2-hydroxy-4-benzaldehyde-semicarbazone-1-arsonic acid are suspended in 40 cc. of water. A hot solution of 4.24 grams of 2,3-dimethoxy-8-nitro-5-(gamma-diethylamino-beta-hydroxypropylamino)-acridine is added; the whole is boiled and filtered. The salt formed separates from the filtrate.

13.—7.4 grams of 4-acetylamino-2,3-dimethylpyrazolone (5)-1-(phenylpara-arsonic acid) are suspended in 40 cc. of water. A hot solution of 4.24 grams of 2,3-dimethoxy-8-nitro-5-(gamma-diethylamino-beta-hydroxypropylamino)-acridine in 30 cc. of methyl alcohol is then added. After boiling for a short time, the solution is filtered. The new salt is separated by means of acetone. It forms a light brown powder which is very easily soluble in water.

14.—7.9 grams of the sodium salt of 2-mercury-thiobenzimidazole-5-arsonic acid are dissolved in 100 cc. of water. A solution of 5 grams of 2,3-dimethoxy-8-nitro-5-(gamma-diethylamino-beta-hydroxypropyl-amino)-acridine-dihydrochloride in 100 cc. of water is added, while stirring. The salt, which rapidly separates, is filtered by suction. It forms a dark brown powder which is difficultly soluble in water.

15.—6.5 grams of the complex copper compound of the sodium salt of 3,4-dihydroxybenzene-1-arsonic acid are dissolved in 80 cc. of water. A solution of 5 grams of 2,3-dimethoxy-8-nitro-5-(gamma-diethylamino-beta-hydroxypropylamino)-acridine-dihydrochloride in 80 cc. of water is added, while stirring. The salt formed separates; after washing and drying, it forms a brownish powder which is difficultly soluble in water.

We claim:

1. A salt of an arsonic acid of the benzene series with an acridine of the following general formula:

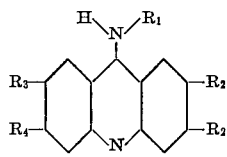

wherein $R_1$ stands for a substituent of the following general formula:

R—N(alkyl)$_2$

R being a radical of the group consisting of ethyl, beta-hydroxypropyl, ethylaminophenyl, beta-hydroxypropylaminophenyl, gamma-ethylamino-beta-hydroxypropylaminophenyl, ethoxyphenyl and acetylethylamide, one of the $R_2$'s stands for the nitro group, the other being hydrogen, $R_3$ stands for hydrogen, alkoxy, dialkylaminoalkoxy or dialkylaminoalkyl, $R_4$ stands for hydrogen, alkoxy or the nitro group, said salt being therapeutically effective and having a yellow to brown color.

2. The salts of benzene arsonic acids of the following formula:

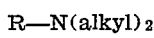

wherein one X stands for an acylamino group, the remaining X for hydrogen or hydroxyl and one Y for halogen, alkyl or hydroxyl, the remaining Y for hydrogen with acridines of the following general formula:

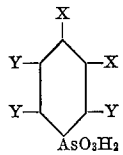

wherein $R_1$ stands for a substituent of the following general formula:

R—N(alkyl)$_2$

R being a radical of the group consisting of ethyl, beta-hydroxypropyl, ethylaminophenyl, beta-hydroxypropylaminophenyl, gamma-ethylamino-beta-hydroxypropylaminophenyl, ethoxyphenyl and acetylethylamide, one of the $R_2$'s stands for the nitro group, the other being hydrogen, $R_3$ stands for hydrogen, alkoxy, dialkylaminoalkoxy, or dialkylaminoalkyl, $R_4$ stands for hydrogen, alkoxy or the nitro group, said salts being therapeutically effective and having a yellow to brown color.

3. The salts of benzene arsonic acids of the following formula:

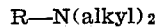

wherein one X stands for an acylamino group, the remaining X for hydrogen or hydroxyl and one Y for halogen, alkyl or hydroxyl, the remaining Y for hydrogen, with 6-nitroacridines of the following general formula:

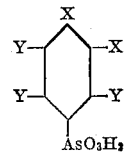

wherein one of the $R_2$'s stands for the nitro group, the other being hydrogen, $R_3$ stands for hydrogen or alkoxy, $R_5$ stands for methyl or ethyl, said salts being therapeutically effective and having a yellow to brown color.

4. The salts of benzene arsonic acids which may be substituted by a radical of the group consisting of halogen, alkyl, hydroxyl, amino and acylamino with acridines of the following general formula:

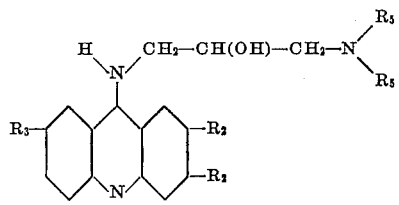

wherein $R_1$ stands for hydrogen or a side chain containing an amino group, one of the $R_2$'s stands for the nitro group, the other being hydrogen, $R_3$ stands for hydrogen, alkoxy, dialkylaminoalkoxy or dialkylaminoalkyl, $R_4$ stands for hydrogen, alkoxy or the nitro group, said salts being therapeutically effective and having a yellow to brown color.

5. The salts of benzene arsonic acids of the following formula:

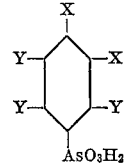

wherein one X stands for an acylamino group, the remaining X for hydrogen or hydroxyl and one Y for halogen, alkyl or hydroxyl the remaining Y for hydrogen, with 2,3-dimethoxy-8-nitro-5-(gamma-diethylamino-beta-hydroxy-propylamino-acridine, said salts being therapeutically effective and having a yellow to brown color.

6. The salt of 9-glycolylamino-6-arsonic acid with 2,3-dimethoxy-8-nitro-5-(gamma-diethylamino-beta-hydroxypropylamino)-acridine, said salt being therapeutically effective and having a yellow to brown color.

7. The salt of 7-methyl-9-glycolylaminobenzene-6-arsonic acid with 2,3-dimethoxy-8-nitro-5-(gamma-diethylamino-beta-hydroxypropylamino)-acridine, said salt being therapeutically effective and forming a brown powder which is very easily soluble in water and not so easily soluble in methyl alcohol.

8. The salt of 8-acetylamino-9-hydroxybenzene-6-arsonic acid with 2,3-dimethoxy-8-nitro-5-(gamma-diethylamino-beta-hydroxypropylamino)-acridine, said salt being therapeutically effective and forming a brown powder which is easily soluble in water.

MAX BOCKMÜHL.
ALFRED FEHRLE.